United States Patent [19]

Maisotsenko

[11] Patent Number: 5,453,223
[45] Date of Patent: Sep. 26, 1995

[54] METHOD OF AIR COOLING AND HEAT EXCHANGE APPARATUS

[75] Inventor: Valeriy S. Maisotsenko, Denver, Colo.

[73] Assignee: ACMA Limited, Singapore

[21] Appl. No.: 303,798

[22] Filed: Sep. 12, 1994

[51] Int. Cl.$^6$ ........................................................ B01F 3/04
[52] U.S. Cl. ............................................ 261/153; 261/154
[58] Field of Search ........................................ 261/153, 154

[56] References Cited

U.S. PATENT DOCUMENTS

| | | | |
|---|---|---|---|
| 2,725,729 | 12/1955 | Mills | 261/154 |
| 4,002,040 | 1/1977 | Munters et al. | 62/121 |
| 4,461,733 | 7/1984 | Otterbein | 261/153 |
| 4,708,832 | 11/1987 | Norback | 261/153 |
| 5,187,946 | 2/1993 | Rotenberg | 261/153 |
| 5,212,956 | 5/1993 | Tsimerman | 261/153 |
| 5,301,518 | 4/1994 | Morozov et al. | 261/153 |
| 5,349,829 | 9/1994 | Tsimerman | 261/153 |

FOREIGN PATENT DOCUMENTS

| | | |
|---|---|---|
| 615319 | 7/1978 | U.S.S.R. . |
| 08424 | 6/1991 | WIPO . |

*Primary Examiner*—Tim R. Miles
*Attorney, Agent, or Firm*—Townsend and Townsend and Crew

[57] ABSTRACT

According to the invention, a first air stream is directed over a first surface of a heat exchange member. The first surface includes a dry area and a moist area. The first stream is directed primarily over the dry area followed by the moist area. A second air stream is directed over a second surface of the heat exchange member perpendicular to the first stream. The second surface is opposite the first surface and has a dry region that is opposite the moist area of the first surface and a moist region that is opposite the dry area of the first surface. The second stream is directed over the dry region followed by the moist region. When the first stream is directed over the first surface, it will be cooled without changing its moisture content due to the cooling of the heat exchange member caused by the second stream passing simultaneously along the moist region on the opposite side. Since the second stream has a temperature lower than that of the ambient environment (the second stream being cooled prior to reaching the moist region by passing along the dry region), when the water evaporates into the second stream from the moist region, the second surface will be cooled to the wet bulb temperature of the second stream. However, since the second stream has been pre-cooled, its wet bulb temperature will be lower than the wet bulb temperature of the ambient air.

32 Claims, 5 Drawing Sheets

METHOD OF AIR COOLING AND HEAT EXCHANGE APPARATUS

BACKGROUND OF THE INVENTION

1. Field of the Invention

The invention is directed to a heat exchange apparatus and a method for cooling various gaseous substances, and particularly to the indirect evaporative cooling of air.

Presently, refrigeration machines are predominantly used for air cooling. Although generally effective in cooling air, such machines consume considerable amounts of energy, have a complicated design, and can be unreliable.

As an alternative to refrigeration machines, methods for evaporative cooling of air have been proposed. Evaporative cooling takes advantage of the natural non-equilibrium of ambient air. The psychrometric difference of air temperatures is used as the source for air cooling, i.e., the difference between the dry bulb temperature and the wet bulb temperature.

For evaporative air cooling, air unsaturated with water vapor is contacted with water. This causes some of the water to evaporate into the air where heat is transferred from the air to the evaporating water. This heat is then returned to the air as latent heat of vaporization. This results in the air temperature being reduced. Theoretically, the temperature can be reduced to the wet bulb temperature of the ambient air.

Although evaporative cooling can be effective in some circumstances, the method of evaporative air cooling has a number of serious drawbacks. One important drawback is the narrow limit of the cooling operation (the wet bulb temperature of the ambient air). Moreover, in evaporative air cooling the ambient air becomes humidified when contacting the water. However, the air's heat content does not vary. In other words, the process of evaporative cooling yields no actual refrigeration, as evident heat is merely converted into latent heat, i.e. the enthalpy of the air remains constant. Hence, air thus humidified and cooled has little value for utilization in air conditioning units.

The process of evaporative air cooling may be feasible in limited climatic zones where the exceedingly low moisture content of ambient air, and its humidification in the process of evaporative cooling, would not cause substantial humidification of air. However, even some humidification may adversely affect the cooling properties of such air when used in air conditioning systems.

A method for indirect evaporative cooling has been proposed as described in USSR Author's Certificate Number 615319, the disclosure of which is hereby incorporated by reference. According to the proposed evaporative cooling method, air is cooled when contacting a heat exchange surface having an opposite side that is moistened with water. Directed over the moistened side of the heat exchange surface is a stream of ambient air. While passing over the moistened side, the ambient air becomes humidified and cooled to approach the wet bulb temperature by the process of evaporative cooling. This process allows the heat exchange surface from which moisture evaporates into the ambient air to be cooled and leads to the cooling of air contacting the opposite side of the heat exchange surface, i.e. the air on the dry side of the heat exchange surface is indirectly cooled.

The method of indirect evaporative cooling also utilizes the natural imbalance of atmospheric air, i.e., the psychrometric temperature difference. As previously described, a limitation of evaporative cooling is that the extent of cooling is limited to the wet bulb temperature of ambient air. In practice, this limitation is even greater with indirect cooling because of the thermal resistance of the heat exchange surface. In addition, the effectiveness of the air cooling is limited due to the low intensity of heat transfer processes between heat exchanging flows of air.

Another method for indirect evaporative cooling has been proposed in U.S. Pat. No. 4,002,040. According to this method, a stream of ambient air is directed through a first group of channels, the walls of which are wetted. As the air passes through these channels, water from the walls is evaporated into the air, causing the air to become humidified and causing the temperature of the channel walls to decrease. Another group of channels are situated against the walls of the first group of channels so that the two sets of channels are in thermal communication. Through the second group of channels, a second stream of air is directed. Since the walls of the second channel are in thermal communication with the walls of the first channels, the second stream of air directed through the second channels is indirectly cooled due to the evaporation occurring in the first channels. As previously described, a limitation to this type of indirect evaporative cooling is the wet bulb temperature of ambient air. Moreover, the degree of cooling is further limited on account of the thermal resistance of the channel walls.

2. Description of the Background Art.

As previously described, USSR Author's Certificate Number 615319 and U.S. Pat. No. 4,002,040 describe methods for indirect evaporative cooling.

SUMMARY OF THE INVENTION

The present invention provides a device and method for indirect evaporative cooling of air below its wet bulb temperature. According to the method, a first air stream is directed over a first surface of a heat exchange member. The first surface includes a dry area and a moist area and the first stream is initially directed primarily over the dry area followed by the moist area. A second air stream is directed over a second surface of the heat exchange member. The second stream is preferably directed in a parallel plane and substantially perpendicularly to the direction of the first stream. The second surface is on a side of the heat exchange member opposite to the first surface and has a dry region that is substantially opposite the moist area of the first surface and a moist region that is substantially opposite the dry area of the first surface. The second stream is initially directed primarily over the dry region followed by the moist region. When the first stream of air is directed over the first surface of the heat exchange member, it will be cooled without changing its moisture content due to the cooling of the heat exchange member caused by the second stream of air passing at the same time along the moist region on the opposite side of the heat exchange member. Since the second air stream has a temperature lower than that of the ambient environment (the second stream of air being cooled prior to reaching the moist region by passing along the dry region), when the water vapors evaporate into the second air stream from the moist region, the second surface will be cooled to the wet bulb temperature limit of the second air stream. However, since the second air stream has been pre-cooled, its wet bulb temperature will be lower than the wet bulb temperature of the ambient air. This same process occurs simultaneously along the first surface as the first air stream is initially directed primarily over the dry area followed by the moist area.

In an exemplary aspect, the dry and the moist areas of the first surface are triangular in geometry and form an orthogonal surface when combined. The dry and the moist regions of the second surface are also triangular in geometry and form an orthogonal surface when combined.

In another aspect of the method, main portions of both the first and second air streams are separated after passing over the first and second surfaces, respectively. The main portions are the portions that pass primarily over the dry area and the dry region. The main portions are suitable for space cooling and air conditioning.

In another aspect, ancillary portions are separated from both the first and second air streams after passing over the moist area and the moist region of the first and second surfaces, respectively. The ancillary portions will usually be discharged into the atmosphere.

In yet another aspect of the method, the combined area (CA) of the dry area and the dry region is determined according to the formula $$CA=S(L-.5L^2),$$

where S is the area of either the first or the second surface and L is the ratio of the quantity of the main portion of the first and second air streams to the total quantity of the first and second air streams directed across the first and second surfaces. The amount of air directed to the main portion of the first and second streams can be varied so that L is in the range from about 0.2 to 0.8.

According to the invention, a heat exchange unit is provided. The heat exchange unit includes a plurality of spaced-apart heat exchange members. Each member has a first side and a second side, with each side having a dry area and a moist area. The dry area on the first side is disposed opposite the moist area on the second side, and the moist area on the first side is disposed opposite the dry area on the second side. Each of the members are spaced-apart so that one of the first or second sides of each member is opposite one of the first or second sides of an adjacent member and so that the opposing sides are mirror images of each other with respect to the dry and moist areas. The heat exchanger further includes means for directing air across the surfaces of the members.

In an exemplary aspect, the first and second sides are square in geometry, and each dry area and each moist area are equal in area and are triangular in geometry. To form the square geometry of the sides, the dry and moist areas are disposed next to each other along a common edge.

In another aspect, each moist area comprises a porous cover on the heat exchange member for receiving a liquid. Also included are means for delivering the liquid to the porous covers of the heat exchange members.

The exchange unit can alternatively be provided with an adjustable air throttle to divide the directed air across the surfaces into a main and an ancillary stream of air after the stream has been directed across the surfaces. The heat exchange unit can alternatively be provided with means for directing the main and the ancillary streams of air away from the members.

In an exemplary embodiment, a heat exchange unit having a plurality of heat exchange members is provided. Each member has a first side and a second side, the first side including a moist area and a dry area. The moist area has a defined thickness so that when the members are stacked together, the moist area of one of the members contacts a second side of another member to form a channel between the members. The position of moist areas and the dry areas are alternated for every other heat exchange member. The unit further includes means for directing air across the first and second surfaces.

In one aspect, the first and second sides are square in geometry. Each dry area and each moist area are equal in area and are triangular in geometry so that when the dry and the moist areas are combined they form the square geometry of the sides. Preferably, the thickness of the moist areas is in the range from about 0.01 cm to 0.5 cm.

In another aspect, each moist area comprises a porous cover on the heat exchange member for receiving a liquid. The porous cover can be constructed from a variety of different materials including capillary porous plastics, high porous paper, natural porous fabrics, and the like.

In yet another aspect, the unit includes means for delivering the liquid to the porous covers of the heat exchange members. An adjustable air throttle is provided to divide the directed air across the surfaces into a main and an ancillary stream of air after the stream has been directed across the surfaces.

DETAILED DESCRIPTION OF THE SPECIFIC EMBODIMENTS

The present invention provides a device and method for cooling air below its wet bulb temperature and up to its dewpoint temperature. The air is cooled below its wet bulb temperature by providing a heat exchange member having a first surface and a second surface opposite the first surface. Each of the surfaces has a dry area and a moist area, and the surfaces are arranged so that the dry area on the first surface is opposite the moist area on the second surface and the moist area on the first surface is opposite the dry area on the second surface. A first stream of air is directed across the first surface, initially primarily over the dry area followed by the moist area. Simultaneously, a second stream is directed across the second surface, initially primarily over the dry area followed by the moist area. The second stream of air is directed substantially perpendicular to the first stream.

With this configuration, the first stream of air passing initially along the dry area will be cooled without changing its moisture content due to the cooling of the heat exchange member by the second stream of air passing simultaneously along the moist area on the opposite or second side of the heat exchange member. Since the second stream of air has a temperature lower than that of ambient air (the second stream of air being pre-cooled prior to reaching the moist area while passing along the dry area of the second surface), when the water evaporates from the moist area of the second surface into the second stream, the heat exchange member will be cooled on the side of the second stream to the wet bulb temperature limit of the second stream of air. However, since the second stream of air was pre-cooled, the wet bulb temperature of the second stream will be lower than the wet bulb temperature of the ambient air. In the extreme case, the temperature of the second stream may be the ambient air dewpoint temperature.

Thus, the second surface of the heat exchange member is cooled to a temperature lower than that of the wet bulb of the ambient air. As the first stream of air passes along the dry area of the first surface of the heat exchange member, the first stream will be cooled to the temperature of the heat exchange member, i.e., to a temperature lower than the wet bulb temperature of the ambient air. Subsequently, the first stream of air passes along the moist area of the first surface and becomes humidified due to the water vapor being evaporated into the first stream. This will further reduce the temperature of the first stream.

Figure 1:
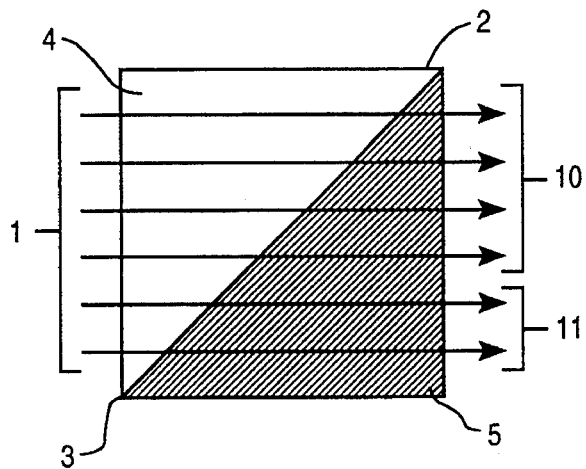
FIG. 1 illustrates a side view of a heat exchange member showing the pattern of air movement across a first surface according to the present invention.
Figure 2:
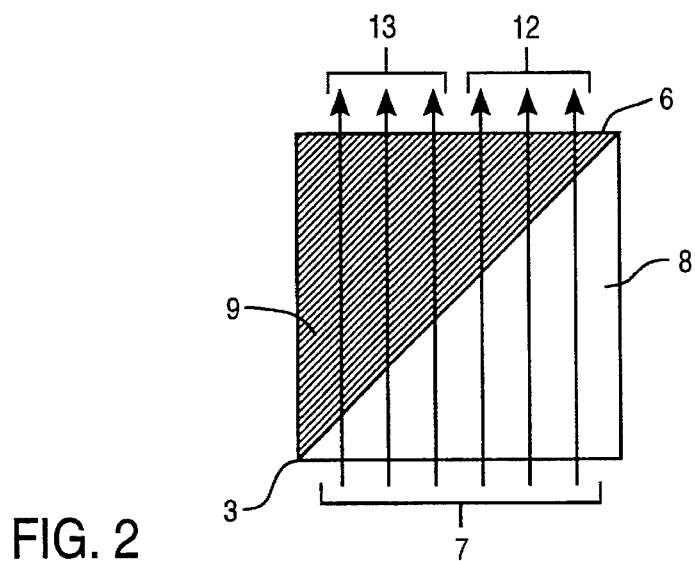
FIG. 2 illustrates a side view of the heat exchange member of FIG. 1 showing the second and opposing side to the first surface and the pattern of air movement across the second surface according to the present invention.
Figure 3:
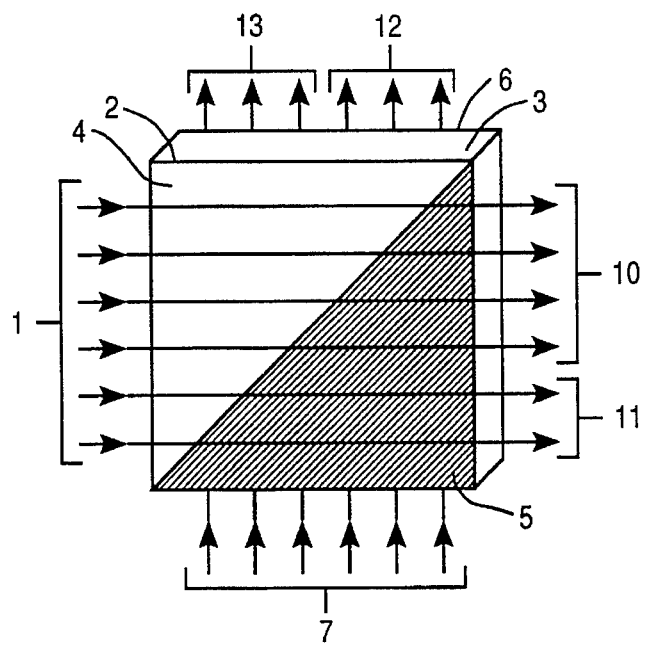
FIG. 3 is a perspective view of the heat exchange member of FIGS. 1 and 2 showing the pattern of air movement across both the first surface and the second surface.

Referring now to FIGS. 1–3, the method for cooling air below the ambient air wet bulb temperature will be described in greater detail. As shown in FIG. 1, an ambient air stream 1 is supplied along a first surface 2 of a heat exchange member 3. The first surface 2 has a dry area 4 and a moist area 5. Both the dry area 4 and the moist area 5 have equal areas, and each is triangular in geometry.

As shown in FIG. 2, second surface 6 of the heat exchange member 3 has a dry region 8 and a moist region 9. The areas of regions 8 and 9 are equal and each is triangular in geometry. Directed across the second surface 6 is a second ambient air stream 7.

As shown in FIG. 3, first surface 2 and second surface 6 are positioned on opposing sides of heat exchange member 3. The surfaces 2, 6 are arranged such that the dry area 4 is opposite the moist region 9, and the moist area 5 is opposite the dry region 8.

The first air stream 1 is directed initially along the dry area 4 and then along the moist area 5. The second air stream 7 passes simultaneously across the second surface 6 and flows in a direction that is substantially perpendicular to the direction of flow of the first air stream 1 so that the air stream 7 passes initially along dry region 8 and then along the moist region 9.

The first air stream 1 includes a main stream 10 and an ancillary stream 11. As shown in FIG. 1, as the main stream 10 moves across the first surface 2, it will initially pass only across the dry area 4. After passing over substantially the entire first surface 2, the main stream 10 will briefly contact the moist area 5. On the other hand, the ancillary stream 11 is only in brief contact with the dry area 4 while passing mostly along the moist area 5.

As shown in FIG. 2, a similar procedure occurs with the second stream 7 which includes a main stream 12 and an ancillary stream 13. The main stream 12 passes primarily over the dry region 8, while the ancillary stream 13 passes primarily over the moist region 9.

As the first stream 1 initially passes along the dry area 4, it is cooled without changing its moisture content due to heat that is diverted from the heat exchange member 3 and into the portion of the stream 7, i.e. the ancillary stream 13, which is simultaneously moving along the second side 6 of the heat exchange member 3, primarily along the moist region 9. The portion of the first stream 1 which passes primarily only over the dry area 4 is the main stream 10. Thus, the main stream 10 is cooled without significantly changing its moisture content.

As just described, the portion of the second stream 7 which passes primarily only over moist region 9 is the ancillary stream 13. Moisture from the moist region 9 is evaporated into the ancillary stream 13 and heat is exchanged to the ancillary stream 13 as latent heat of water vapor. This cools the ancillary stream 13 within the range of the wet bulb temperature of the ambient air. On the opposite side of the moist region 9 is dry area 4 over which the main stream 10 is primarily directed. Prior to contacting the moist region 9, ancillary stream 13 briefly contacts the dry region 8. As a result, the temperature of the ancillary stream 13 is reduced without changing its moisture content due to the diversion of heat by the portion of the first stream 1 simultaneously passing over the moist area 5, i.e. the ancillary stream 11. The result is that the wet bulb temperature of the ancillary stream 13 will be lower than that of ambient air. Hence, the temperature of the cooled main stream 10 will also be lower than the wet bulb temperature of the ambient air. The limit of cooling of the main stream 10 is the dewpoint temperature of the ambient air.

The main stream 10 is cooled below the wet bulb temperature of ambient air after having contacted the dry area 4. However, before exiting the first surface 2, the main stream 10 contacts a portion of the moist area 5. This causes the main stream 10 to increase its moisture content while at the same time further reducing its temperature. This leads to still more effective cooling of the main stream 10. After the main stream 10 has passed beyond the first surface 2, it will be supplied to the consumer.

The ancillary stream 11 passes primarily along the moist area 5 wherein moisture is evaporated into the ancillary stream resulting in the cooling of the heat exchange member 3 at the moist area 5. Prior to contacting the moist area 5, the ancillary stream 11 initially contacts a small portion of the dry area 4. The contact with the dry area 4 cools the ancillary stream 11 prior to its contact with the moist area 5. This allows the moist area 5 to be cooled below the wet bulb temperature of the ambient air. Since the dry region 8 is opposite the moist area 5, the main stream of air 12 is cooled to the same temperature of the moist area 5, i.e. below the wet bulb temperature of the ambient air. Simultaneously, the ancillary stream 11 is heated, humidified, and is discarded into the ambient atmosphere upon passing beyond the moist area 5.

A similar process occurs with the second stream 7 passing along the second side 6 of the heat exchange member 3. The portion of the second stream 7 which flows along the dry region 8 (which is essentially the main stream 12) is cooled without changing its moisture content due to the exchange of heat into the portion of the first stream 1 which is moving simultaneously along the first side 2 of the heat exchange member 3 and along the moist area 5. The portion of the first stream 1 which flows primarily along the moist area 5 is the ancillary stream 11. The moisture from the moist area 5 evaporates into the ancillary stream 11 which absorbs the latent heat of evaporation and cools the ancillary stream 11 to the wet bulb temperature of the ambient air. Opposing the moist area 5 is the dry region 8 on the second surface 6. Directed over the dry region 8 is the main air stream 12 which is cooled while passing over the dry region 8. Prior to contacting the moist area 5, the ancillary air stream 11 contacts the dry area 4. This causes the temperature of the ancillary stream 11 to be reduced due to the diversion of heat by the portion of the second stream 7 (which is primarily the ancillary stream 13) passing simultaneously along the moist region 9 located on the second surface 6 of the heat exchange member 3. This reduces the temperature of the ancillary stream 11 below the wet bulb temperature of the ambient air. Hence, the temperature of the main stream 12 passing over the opposite side of the heat exchange member 3 is cooled to a temperature below the wet bulb temperature of the ambient air, the limiting temperature being the dew-point temperature.

The main air stream 12 is cooled below the wet bulb temperature after contacting the dry region 8. Upon further travel, the main stream 12 contacts a portion of the moist region 9. This causes the main stream 12 to increase its moisture content which results in a further reduction of the temperature of the main stream 12. This results in still more effective cooling of the main stream 12, which is then delivered to the consumer. When the portion of the second stream 7 passes along the moist region 9 (which is primarily the ancillary stream 13), some of the moisture evaporates into the ancillary stream 13 which cools the moist region 9. However, since the ancillary stream 13, prior to contacting the moist region 9, contacts a small portion of the dry region 8, the ancillary stream 13 is partially cooled prior to contacting the moist region 9. This results in the cooling of the moist region 9 below the wet bulb temperature of the ambient air. The main air stream 10 is passing on the opposite side of the heat exchange member 3 is then cooled to the temperature of the moist region 9 which is in contact with the dry area 4. During this procedure, the ancillary stream 13 is heated and humidified and is passed to the ambient atmosphere after leaving the moist region 9.

The quantitative division of the first stream 1 into the main stream 10 and the ancillary stream 11 (and similarly the second stream 7 being quantitatively divided into the main stream 12 and the ancillary stream 13) depends upon the moisture content of the ambient air, i.e., on the moisture content of the air streams 1, 7. If streams 1, 7 have a low moisture content, a greater portion can be diverted to the main streams 10, 12. Preferably, the maximum portion of air diverted to main streams 10, 12 will be about 80%. Correspondingly, the ancillary streams 11, 13 will receive about 20% of the air from streams 1, 7.

If the streams 1, 7 have a high moisture content, then the main streams 10, 12 will receive a lesser portion of air. Preferably, main streams 10, 12 will always receive at least about 20% of the air from streams 1, 7. Correspondingly, if main streams 10, 12 receive about 20% of streams 1, 7, the ancillary streams 11, 13 will each receive about 80% from streams 1, 7.

In an exemplary aspect, air taken from living space is utilized for either air streams 1 or 7. When cooling air in a living space in the summer, the temperature of the air in the room is typically lower than the temperature of the ambient air. Thus, when the living space air is used for air stream 1 or 7 (instead of the ambient air), the cooling effectiveness of the method just described is further increased. As the air in the room is recirculated over the heat exchange member 3, the air will be cooled due to both a reduction of its temperature and decrease of its heat load in the process of cooling. Such a phenomenon occurs primarily due to the fact that the living space air has a lower temperature of the wet bulb than the ambient air.

The combined surface area of the dry area 4 and the dry region 8 ($S_{dry}$) and the combined surface area of the moist area 5 and the moist region 8 ($S_{moist}$) are preferably calculated using the formula:

$$S_{dry}=S(L-.5L^2)$$

$$S_{moist}=0.5SL^2,$$

where S is the area of one of the surfaces of the heat exchange member 3, and L is the ratio of the quantity of air supplied to the consumer to the total quantity of air directed along both surfaces of the heat exchange member 3. More specifically, L is the amount of air in main streams 10 and 12 divided by the amount of air in streams 1 and 7. Preferably, the ratio L will be in the range from about 0.2 to 0.8.

Referring to FIGS. 4–7, an exemplary embodiment of a heat exchange unit 40 will be described. The heat exchange unit 40 includes a body 14 and a water tray 15. The body is preferably constructed of either metal or plastic and serves as a housing for the internal elements of the unit 40. The body 14 has a general air inflow pipe 16 through which ambient air is introduced into the body 14. The body 14 further includes a series of outflow pipes for discharging the air introduced through the inflow pipe. These outflow pipes include a first main stream outflow pipe 17, a first ancillary stream outflow pipe 23, a second main stream outflow pipe 22, and a second ancillary outflow pipe 18.

Figures 6, 7:
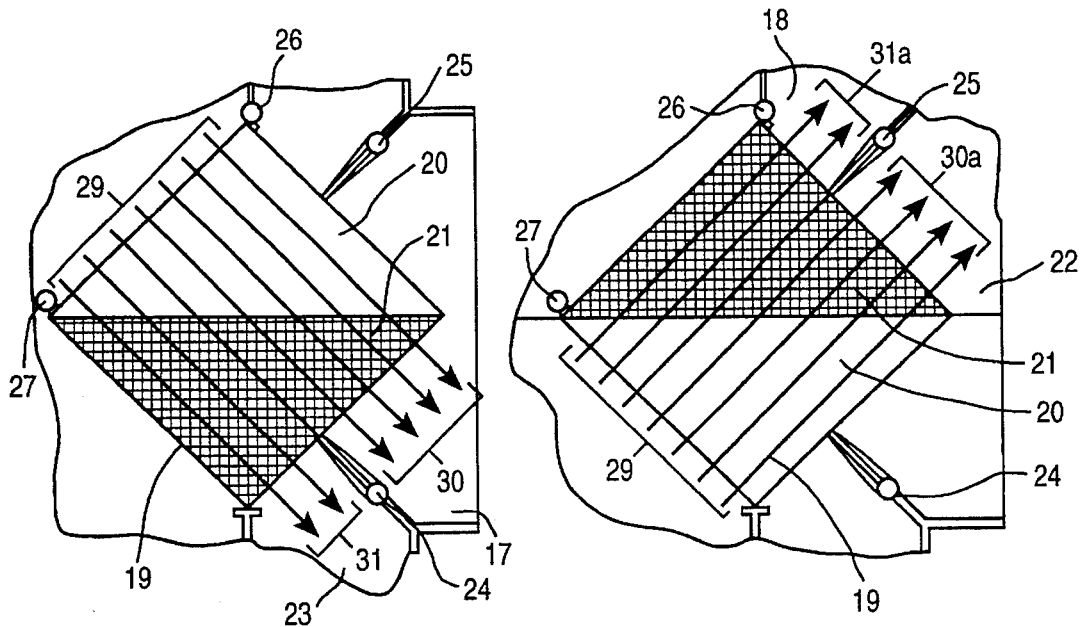
FIG. 6 is a schematic view of the heat exchange apparatus of FIG. 5 taken along lines 6—6.
FIG. 7 is a schematic view of the heat exchange apparatus of FIG. 5 taken along lines 7—7.

A plurality of heat exchange plates 19 are vertically arranged within the body 14. As best shown in FIGS. 6 and 7, each heat exchange plate 19 has a surface with a moisture-proof cover 20 and a capillary/porous cover 21. Both covers 20 and 21 have an equal surface area and are triangular in geometry forming a square when combined on the plate 19. The heat exchange plates 19 can be constructed from a variety of materials including plastics, metals, paper, fabrics, card-board, and the like. Such materials are used to provide good thermal conductivity and to allow for good water evaporation. Preferable materials for constructing the capillary/porous covers 21 include porous plastics, paper, natural porous fabrics, and the like. The use of such materials are preferred because of their effectiveness in allowing the water in the covers 21 to be evaporated into the air stream. The moisture-proof covers will preferably be constructed of materials impermeable to moisture and materials that provide for good heat exchange.

Figure 5:
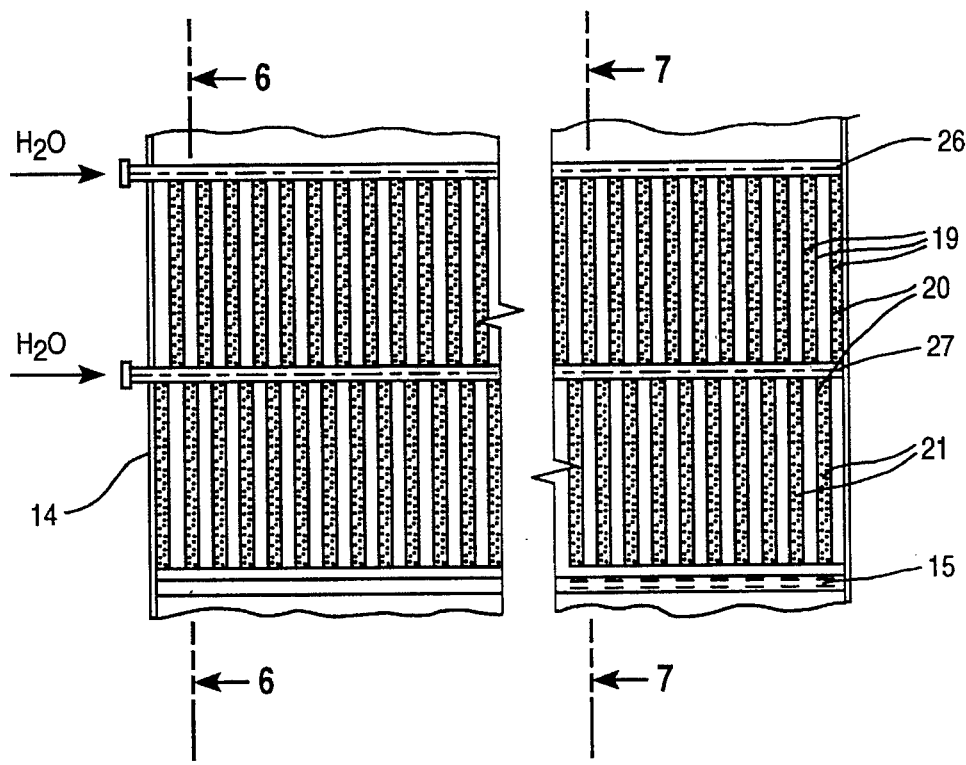
FIG. 5 illustrates the heat exchange apparatus of FIG. 4 taken along lines 5—5.

The plates 19 are arranged in a parallel manner in the body 14 as best shown in FIG. 5. The plates 19 are alternated so that the moisture-proof covers 20 of every other plate are aligned with each other and the capillary/porous covers 21 of every other plate are aligned with each other. The capillary/porous covers 21 have a thickness in the range from about 0.01 cm to 0.5 cm. When the plates 19 are placed together in a parallel fashion, the covers 21 keep the plates 19 separated to form a plurality of ducts between the plates 19. With this configuration, air can be directed over the moisture-proof covers 20 and through the capillary/porous covers 21 as shown schematically in FIGS. 6 and 7.

Figure 4:
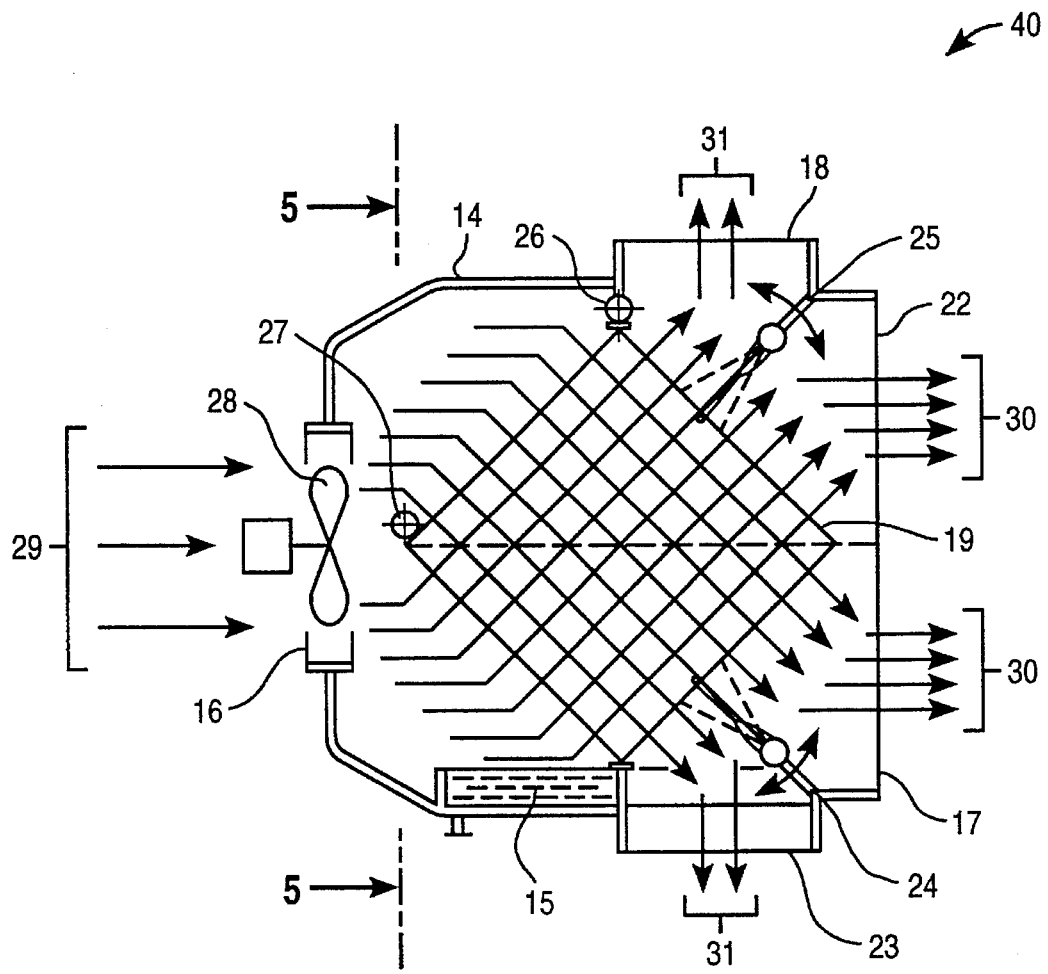
FIG. 4 is a schematic front view of a heat exchange apparatus for air cooling according to the present invention.

As shown in FIG. 4, an adjustable air throttle 24 is located between the main stream outflow pipe 17 and the ancillary stream outflow pipe 23. An adjustable throttle 25 is located between the ancillary stream outflow pipe 18 and the main stream outflow pipe 22. Throttles 24, 25 assist in separating the air streams into main and ancillary streams where they can exit through their respective outflow pipes as shown in FIGS. 6–7.

Perforated tubes 26, 27 are provided for moistening the capillary/porous covers 21. Tubes 26, 27 supply water to the covers 21 by natural water dropping or by pumping water to the covers. To direct air from the inflow pipe 16 across the plate 19, a fan 28 (see FIG. 4) is provided.

The heat exchange unit 40 operates as follows. A general air stream 29 is produced when fan 28 is rotated. The general air stream 29 flows through the general stream inflow pipe 16 and into the series of ducts formed between the plates 19. Since the position of the moisture-proof covers 20 and the capillary/porous covers 21 is alternated on every other plate 19, two types of ducts are formed. In the first type, as shown in FIG. 6, the moisture-proof cover 20 is above the capillary/porous cover 21. Oppositely, as shown in FIG. 7, the second type of ducts have the capillary/porous cover 21 above the moisture-proof cover 20.

For the type of ducts having the moisture-proof cover 20 on top, the general air stream 29 will initially pass over moisture proof cover 20 and then along the capillary/porous cover 21, as shown in FIG. 6. The adjustable air throttle 24 divides the general air stream 29 into a first main stream 30 and a first ancillary stream 31. First main stream 30 is cooled as it passes along the moisture-proof cover 20 and then partially adiabatically remoistened as it crosses the capillary/porous cover 21. The first main stream 30 then exits through the outflow pipe 17 and is supplied to the consumer (see FIG. 4). The first ancillary stream 31 is heated and moistened when passing through the capillary/porous cover 21 and exits through the first ancillary pipe 23 where it is discharged into the ambient atmosphere.

A similar process occurs with the ducts having the capillary/porous cover 21 above the moisture-proof cover 20, as shown in FIG. 7. The general air stream 29 is divided into a second main stream 30A and a second ancillary stream 31A by the adjustable throttle 25. The second main stream 30A is initially cooled as it passes along the moisture-proof cover 20 and partially adiabatically remoistened when passing through the capillary/porous cover 21. The second main stream 30A then exits through the second main stream outflow pipe 22 where it will be supplied to the consumer (see FIG. 4). The second ancillary stream 31A is heated and moistened while passing through capillary/porous covers 21 and exits through outlet pipe 18 where it will be discharged into the atmosphere.

Figure 8:
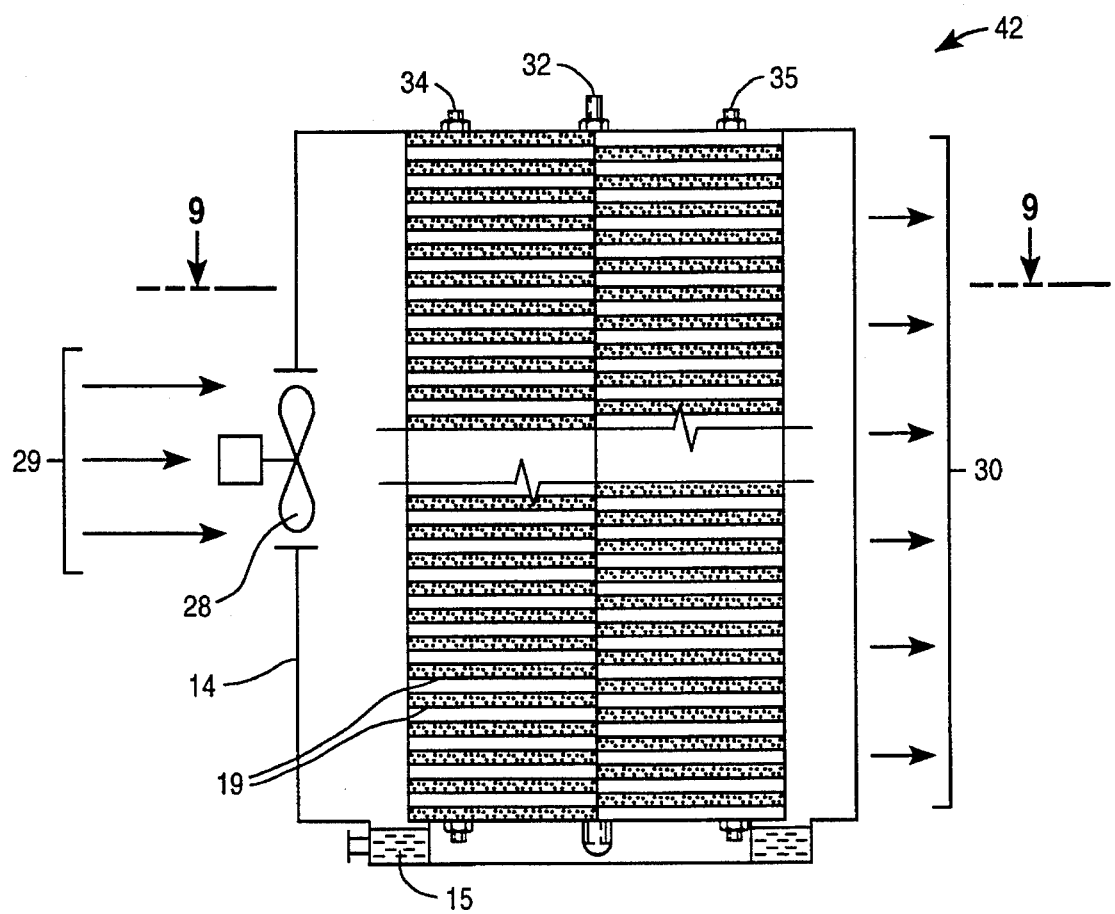
FIG. 8 is an alternative embodiment of a heat exchange apparatus for air cooling according to the present invention.
Figure 9:
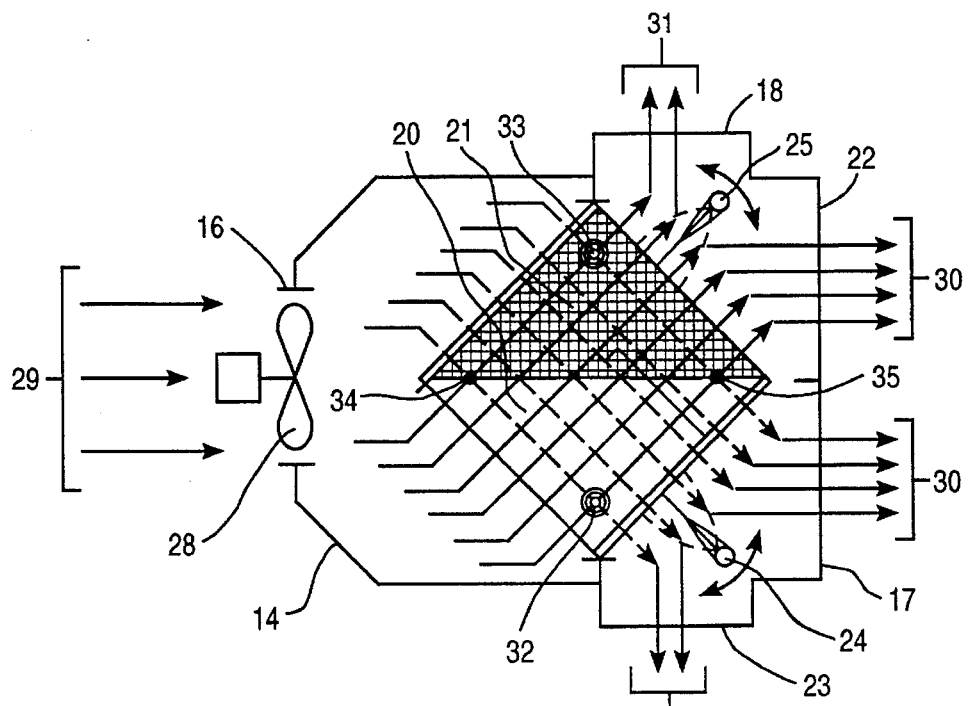
FIG. 9 is a schematic view of the heat exchange apparatus of FIG. 8 taken along lines 9—9.

As previously described, the heat exchange plates 19 of the heat exchange unit 40 are vertically aligned. The plates 19 are vertically arranged so that water moves more efficiently for wetting. Alternatively, as shown in FIGS. 8 and 9, the heat exchange plates 19 can be horizontally arranged to form a heat exchange unit 42. The heat exchange unit 42 is constructed essentially identical to the heat exchange unit 40 of FIG. 4 except that the unit 42 employs a different water supply system to deliver water to the capillary/porous covers 21 as described hereinafter. Also different from the heat exchange unit 40, the heat exchange unit 42 includes four supports 32, 33, 34, 35 onto which the horizontal heat exchange plates 19 are fixed. The heat exchange plates 19 are horizontally aligned to form a series of ducts through which the general air stream 29 is directed, as previously described.

The supports 32, 33 are tubular and in one aspect are used to transport water to the covers 21. The supports 32, 33 have perforations located near each capillary/porous cover 21 so that when water is directed through the supports 32, 33, the water is distributed to the covers 21 through the perforated openings to moisten the capillary/porous covers 21.

Figure 10:
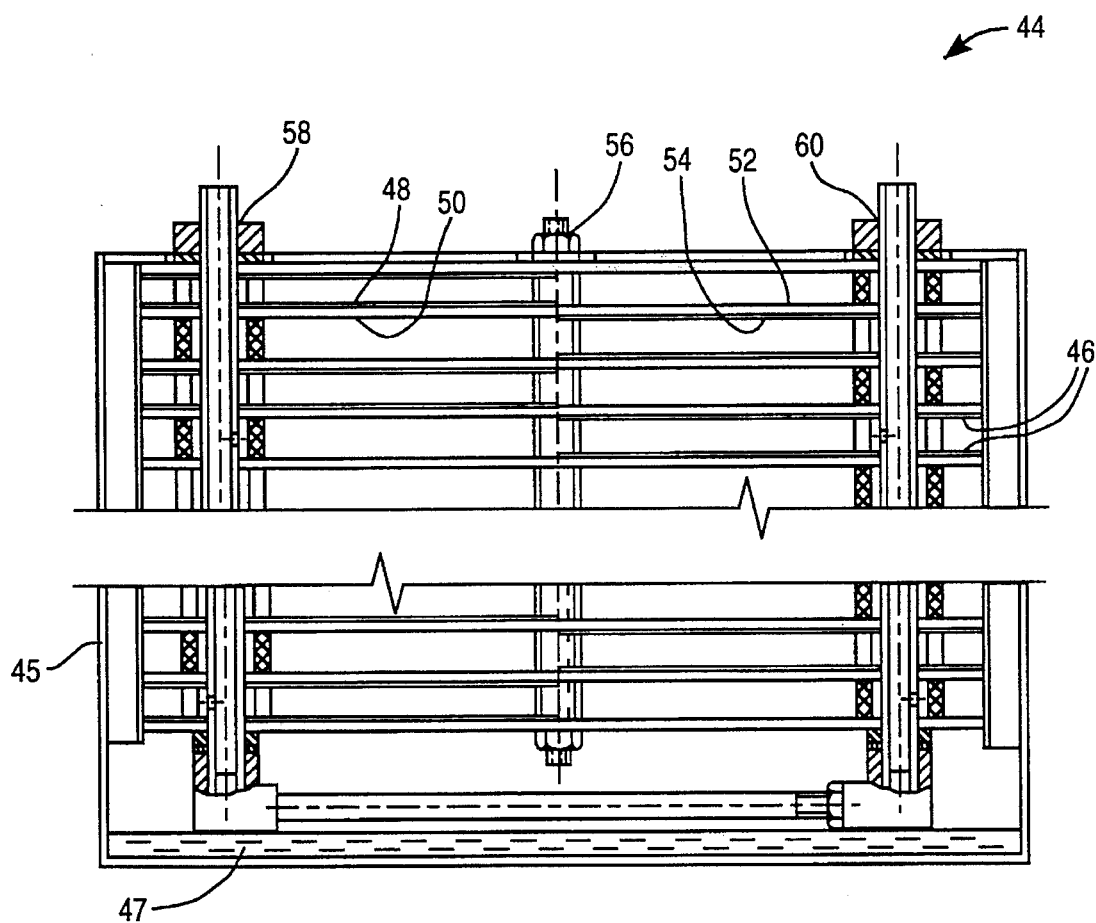
FIG. 10 illustrates a further alternative embodiment of a heat exchange apparatus according to the present invention.

Another exemplary heat exchange unit 44 is shown in FIG. 10. The unit 44 includes a plurality of spaced-apart heat exchange members 46 that are housed in a body 45 having a water tray 47. The body 45 and water tray 47 can be constructed essentially identical to those described in the previous embodiments. The heat exchange members 46 will preferably constructed from materials including metal, plastic, paper, fabric, cardboard, and the like. Each member 46 has a first side 48 and a second side 50, with each side 48, 50 having a dry area 52 and a moist area 54. The dry area 52 on the first side 48 is opposite the moist area 54 on the second side 50, and the moist area 54 on the first side 48 is opposite the dry area 52 on the second side 50. Each of the members 46 is spaced-apart so that one of the first or second sides 48, 50 of each member 46 is opposite one of the first or second sides 48, 50 of an adjacent member 46 and so that the opposing sides are mirror images of each other with respect to the dry and moist areas 52, 54. Preferably, the members 46 will be spaced apart in the range from about 0.02 cm to 2 cm. This spacing is sufficient to insure that the moist areas 54 will not contact each other and allows for a greater amount of air to be directed between the members 46 since the moist areas 54 are not in contact with each other. Exemplary materials for constructing the moist areas 54 include capillary porous plastic, highly porous paper, natural fabrics, card-board, and the like. Exemplary materials for constructing the dry areas include metal, plastic, polyethylene film, aluminum foil, and the like.

The heat exchange members 46 are held apart by tubular members 56, 58, and 60. Water can be directed through tubular members 58, 60 so that the moist areas 54 can be wetted as previously described in connection with previous embodiments.

The dry and moist areas 52, 54 are triangular in geometry and air is directed across the members 46 in essentially the same manner as previously described with units 40 and 42 except that air passes primarily over the moist areas 54 instead of passing directly through them. This results in the cooling of the ambient air to a temperature below its wet bulb temperature.

Working Example

The heat exchange unit 40 (shown in FIGS. 4–6 of the present invention) was compared to a heat exchange unit of the type having a first group of horizontal channels, the walls of which are wetted. As ambient air is directed through these channels, water from the walls is evaporated into the air, causing the air to become humidified and causing the temperature of the channel walls to decrease. A second group of vertical channels (having dry inner walls) are situated against the walls of the first group of channels so that the sets of channels are in thermal communication. Through the second group of channels, a second stream of air is directed. Since the walls of the second channel are in thermal communication with the walls of the first channels, the second stream of air directed through the second channels is indirectly cooled due to the evaporation occurring in the first channels. This type of heat exchange unit is described in FIG. 1 of U.S. Pat. No. 4,002,040.

In the heat exchange unit 40 of the present invention, the general stream of air 29 was directed at a rate of 240 m³/hr and at a dry bulb temperature of 35.1° C. (the wet bulb temperature being 22.6° C.) across the moisture-proof covers 20 and the moistened capillary/porous covers 21 of the heat exchange plates 19 as previously described in connection with unit 40. When moving across the plates 19, the main stream 30 (having a rate of 121 m³/hr) experienced a reduction in temperature to 18.1° C. (the wet bulb temperature for the main stream 30 being 17.6° C.). The ancillary stream 31 (moving at a rate of 119 m³/hr) experienced a reduction in temperature to 29.2° C. (the wet bulb temperature of the ancillary stream 31 being 6.8° C.).

As the general stream 29 was passed over the plates 19, an aerodynamic pressure loss of 105 PA was realized. The generator required to produce the general stream 29 is operated at 12 watts. The total area of heat exchange surface for the plates 19 amounted to 0.672 m².

In the method of air cooling of the type described in FIG. 1 of U.S. Pat. No. 4,002,040, the same area of heat exchange surface (0.672 m²) was used. Also, the same flow rates of the general air stream (238 m³/hr), the ancillary stream (115 m³/hr), and the main stream (123 m³/hr) were used under the same parameters of the ambient air (the dry bulb temperature of 34.9° C. and the wet bulb temperature of 22.5° C.). This produced a main stream temperature to be supplied to the consumer of 23.5° C. of the dry bulb temperature (19.1° C. of the wet bulb temperature). The loss of aerodynamic pressure in this process amounted to 104 PA and the generator operated at a value of 12 V.

A summary of the test results as previously described are shown in Table 1 below.

main stream, air was cooled to the temperatures 23.5° C., 17.2° C., and 21.4° C., respectively.

Although the foregoing invention has been described in detail by way of illustration and example, for purposes of clarity and understanding, it will be obvious that certain changes and modification may be practiced within the scope of the appended claims. For example, the heat exchange apparatus can be used in both fixed air conditioning systems as well as in those which are portable. Further, the invention is not limited to only the cooling of air, but can be used to cool various chemicals, gasses, or like substances.

What is claimed is:

1. A method for cooling air comprising the steps of:
    directing a first air stream over a first surface of a heat exchange member, the first surface having a dry area and a moist area, the first stream being initially directed primarily over the dry area followed by the moist area; and
    directing a second air stream over a second surface of the heat exchange member disposed on an opposite side of the first surface, the second stream being directed substantially perpendicular to the direction of the first stream, the second surface having a dry region substantially opposite the moist area of the first surface and a moist region substantially opposite the dry area of the first surface, and the second air stream being initially directed primarily over the dry region followed by the moist region.

2. The method of claim 1, wherein one of the first or second streams is directed within a living area.

3. The method of claim 1, wherein the dry and the moist

TABLE 1

TEST RESULTS OF THE UNITS REALIZING THE PROPOSED AND THE KNOWN METHODS OF AIR COOLING

| METHODS OF COOLING AND APPARATUSES FOR THEIR REALIZATION | AIR FLOW RATE, M³/Hr | | | TEMPERATURE, °C. | | | | | | PRESSURE LOSS PA | POWER CONSUMED Watt | SURFACE OF THE HEAT EXCHANGE M² |
|---|---|---|---|---|---|---|---|---|---|---|---|---|
| | GENERAL STREAM | MAIN STREAM | ANCILLARY STREAM | GENERAL STREAM | | MAIN STREAM | | ANCILLARY STREAM | | | | |
| | | | | $t_d$ | $t_m$ | $t_d$ | $t_m$ | $t_d$ | $t_m$ | | | |
| 1. PROPOSED UNIT | 240 | 121 | 119 | 35.1 | 22.6 | 18.1 | 17.6 | 29.2 | 26.8 | 105 | 12 | 0.672 |
| KNOWN UNIT | 238 | 123 | 115 | 34.9 | 22.5 | 23.5 | 19.1 | 27.8 | 26.0 | 104 | 12 | 0.672 |
| 2. PROPOSED UNIT | 239 | 120 | 119 | 26.1 | 16.3 | 12.1 | 11.0 | 22.6 | 20.7 | 104 | 12 | 0.672 |
| KNOWN UNIT | 241 | 124 | 117 | 26.3 | 16.4 | 17.2 | 13.2 | 22.1 | 20.3 | 105 | 12 | 0.672 |
| 3. PROPOSED UNIT | 242 | 122 | 120 | 37.4 | 20.1 | 13.2 | 11.6 | 31.8 | 26.9 | 107 | 12 | 0.672 |
| KNOWN UNIT | 240 | 122 | 118 | 37.2 | 19.9 | 21.4 | 14.6 | 30.9 | 26.2 | 105 | 12 | 0.672 |

$t_d$ — DRY-BULB TEMPERATURE OF THE AIR.
$t_m$ — WET-BULB TEMPERATURE OF THE AIR.

The heat exchange unit 40 of the present invention dramatically lowered the temperature of the air supplied to the consumer, as compared to the prior known method. For instance, the present invention cooled the main stream of air to the temperature of 18.1° C., 12.1° C., 13.2° C., depending on the heat and moisture parameters of the air. With the prior known method of the type previously described, cooling under the same heat and moisture parameters of the ambient areas are triangular in geometry and form an orthogonal surface when combined, and wherein the dry and the moist regions are triangular in geometry and form an orthogonal surface when combined.

4. The method of claim 3, further comprising separating an ancillary portion from the second stream of air after passing the second stream over the second surface, the ancillary portion passing primarily over the moist region.

5. The method of claim 3, further comprising separating a main portion from the first air stream after passing the first stream over the first surface, the main portion passing primarily over the dry area.

6. The method of claim 5, further comprising directing the main portion into a building interior.

7. The method of claim 3, further comprising separating an ancillary portion from the first air stream after passing the first stream over the first surface, the ancillary portion passing primarily over the moist area.

8. The method of claim 7, further comprising discharging the ancillary portion into the atmosphere.

9. The method of claim 3, wherein the combined areas of the dry area and the dry region have a value calculated according to the formula $S(L - 0.5 L^2)$, where S is the area of either the first surface or the second surface and L is the ratio of the quantity of a portion of the first air stream crossing primarily over the dry area and a portion of the second air stream crossing primarily over the dry region to the total quantity of the first air stream and the second air stream.

10. The method of claim 9, wherein the main portions of the first and the second streams have a value based on L in the range from about 0.2 to 0.8.

11. The method of claim 3, further comprising separating a main portion from the second stream of air after passing the second stream over the second surface, the main portion passing primarily over the dry region.

12. The method of claim 11, further comprising directing the main portion into a building interior.

13. A heat exchange unit, comprising:

a plurality of spaced apart heat exchange members, each member having a first side and second side, each side having a dry area and a moist area, the dry area on the first side being opposite the moist area on the second side and the moist area on the first side being opposite the dry area on the second side, wherein the members are spaced apart so that one of the first or second sides of each member is opposite one of the first or second sides of an adjacent member, and wherein the opposing sides are mirror images of each other with respect to the dry and the moist areas; and means for directing air across the sides of the members.

14. The unit of claim 13, wherein the first and second sides are square in geometry and wherein each dry area and each moist area are equal in area and are triangular in geometry, the dry and the moist areas being disposed next to each other along a common edge.

15. The unit of claim 14, wherein the heat exchange members are spaced-apart in the range from about 0.2 cm to 2 cm.

16. The unit of claim 14, further comprising an adjustable air throttle to divide the directed air across the surfaces into a main and an ancillary stream of air after the stream has been directed across the sides.

17. The unit of claim 16, further comprising means for directing the main and the ancillary air streams away from the members after the streams have passed over the members.

18. The unit of claim 13, wherein each moist area comprises a porous cover on the heat exchange member for receiving a liquid.

19. The unit of claim 18, wherein the porous cover is constructed from materials selected from the group consisting of capillary porous plastic, porous paper, natural fabrics, and cardboard.

20. The unit of claim 18, further comprising means for delivering the liquid to the porous covers of the heat exchange members.

21. A heat exchange unit, comprising:

a plurality of heat exchange members, each member having a first side and a second side, the first side having a moist area and a dry area, the moist area having a defined thickness, wherein the members are stacked together so that the moist area of one of the members contacts a second side of another member forming a channel between the members, and wherein the position of moist areas and the dry areas on the members are alternated for every other member; and means for directing air across the first and second sides.

22. The unit of claim 21, wherein the thickness of the moist areas is in the range from about 0.01 cm to 0.5 cm.

23. The unit of claim 21, wherein each moist area comprises a porous cover on the heat exchange member for receiving a liquid.

24. The unit of claim 23, wherein the porous cover is constructed from materials selected from the group consisting of capillary porous plastic, porous paper, natural fabrics, and cardboard.

25. The unit of claim 23, further comprising means for delivering the liquid to the porous covers of the heat exchange members.

26. The unit of claim 21, wherein the first and second sides are square in geometry and wherein each dry area and each moist area are equal in area and are triangular in geometry, the dry and the moist areas being disposed next to each other along a common edge.

27. The unit of claim 26, further comprising an adjustable air throttle to divide the directed air across the surfaces into a main and an ancillary stream of air after the stream has been directed across the sides.

28. The unit of claim 27, further comprising means for directing the main and the ancillary air streams away from the members after the streams have passed over the members.

29. A heat exchange unit, comprising:

a heat exchange member having a first side and a second side, each of the sides having a dry area and a moist area, the dry area on the first side being opposite the moist area on the second side and the moist area on the first side being opposite the dry area on the second side; and means for directing air across the sides of the member.

30. The unit of claim 29, wherein the first and second sides are square in geometry and wherein each dry area and each moist area are equal in area and are triangular in geometry, the dry and the moist areas being disposed next to each other along a common edge.

31. The unit of claim 29, wherein each moist area comprises a porous cover on the heat exchange member for receiving a liquid.

32. The unit of claim 31, wherein the porous cover is constructed from materials selected from the group consisting of capillary porous plastic, porous paper, natural fabrics, and cardboard.

* * * * *